S. G. HARWOOD.
PORTABLE PARCEL CARRIER.
APPLICATION FILED SEPT. 27, 1909.

1,149,647.

Patented Aug. 10, 1915.
7 SHEETS—SHEET 1.

Fig. 1.

Witnesses:
L. L. Simpson
E. C. Skinkle

Inventor:
Stanley G. Harwood
By his Attorneys:
Williamson Merchant

S. G. HARWOOD.
PORTABLE PARCEL CARRIER.
APPLICATION FILED SEPT. 27, 1909.

1,149,647.

Patented Aug. 10, 1915.
7 SHEETS—SHEET 5.

Witnesses:
L. L. Simpson
E. C. Skinkle

Inventor:
Stanley G. Harwood
By his Attorneys:
Williamson & Merchant

S. G. HARWOOD.
PORTABLE PARCEL CARRIER.
APPLICATION FILED SEPT. 27, 1909.

1,149,647.

Patented Aug. 10, 1915.
7 SHEETS—SHEET 6.

Witnesses:
L. L. Simpson
E. C. Skinkle

Inventor:
Stanley G. Harwood
By his Attorneys:
Williamson Merchant

S. G. HARWOOD.
PORTABLE PARCEL CARRIER.
APPLICATION FILED SEPT. 27, 1909.

1,149,647.

Patented Aug. 10, 1915.
7 SHEETS—SHEET 7.

Witnesses:
L. L. Simpson
E. C. Skinkle

Inventor:
Stanley G. Harwood,
By his Attorneys:
Williamson Merchant

UNITED STATES PATENT OFFICE.

STANLEY G. HARWOOD, OF MINNEAPOLIS, MINNESOTA.

PORTABLE PARCEL-CARRIER.

1,149,647.　　　　　Specification of Letters Patent.　　Patented Aug. 10, 1915.

Application filed September 27, 1909. Serial No. 519,703.

*To all whom it may concern:*

Be it known that I, STANLEY G. HARWOOD, a citizen of the United States, residing at Minneapolis, in the county of Hennepin and State of Minnesota, have invented certain new and useful Improvements in Portable Parcel-Carriers; and I do hereby declare the following to be a full, clear, and exact description of the invention, such as will enable others skilled in the art to which it appertains to make and use the same.

Generally stated, my invention has for its object to provide a simple and efficient portable parcel carrier.

The invention, however, was especially designed and is particularly adapted for use in loading and unloading box cars. For this latter noted purpose, the carrier must be flexible so that it may be moved into the box car through one of the side doors thereof and the delivery end thereof moved from end to end and from side to side of the car for the purpose of delivering sacks, boxes or other parcels close to the places where they are to be packed, in the loading of the car or for receiving the parcels in unloading. Also the carrier should have vertical flexibility so that it may be readily run from a platform up a slightly inclined deck and onto the floor of the car. All of these requirements and others are met in my improved carrier.

The invention consists of the novel devices and combinations of devices hereinafter described and defined in the claims.

In the accompanying drawings, which illustrate the invention, like characters indicate like parts throughout the several views.

Referring to the drawings.

The parcels are carried from a suitable receiving point and delivered to the improved carrier proper by an endless belt 1 which, at its delivery portion, runs over a pulley 2 carried by a shaft 3 mounted in suitable bearings on a fixed framework, as shown, made up of horizontal channel beams 4 and vertical laterally spaced supporting posts 5. On the shaft 3, at one side of the pulley 2, is a sprocket 6, over which runs a power-driven sprocket chain 7. This chain also runs over other sprockets presently to be described. The belt 1 delivers the parcels onto an inclined deck 8, shown as supported from the beams 4 by metal straps 9.

As illustrated in the drawings, the carrier proper is made up of three inflexible truck frames, connected by two flexible joint sections, but, in practice, the number of these flexible and inflexible sections may be carried out to any desired extent, depending on the character of the work to be done. The first or so-called head truck frame is adapted, when in an operating position, to remain stationary, or to travel inward and outward, and the other two truck frames are universally portable, that is, are capable of being moved laterally and inward and outward as well as upward and downward while the carrier is in operation. This head truck frame is of rectangular form and preferably is made up of laterally spaced skeleton channel-iron side frames 10 and transverse tie bars 10ª, supported by truck wheels 11 mounted to run on channel-shaped track rails 12. Normally this head truck frame occupies a position between the posts 5 and below the deck 8 and the carrier belt 1.

Mounted in suitable bearings on the sides of the head truck frame 10 is a transverse shaft 13 which, at its intermediate portion, carries a pair of heavy laterally spaced sprocket wheels 14. At one end, the said shaft 13 is provided with a sprocket 15, under which the power-driven chain 7 runs. This sprocket chain 7 also runs over a pair of idle guide sprockets 16 mounted on one side of the truck frame 10 and alined with said sprocket 15. This arrangement of sprockets and chain permits the truck frame 10 to be moved inward and outward on the rails 12, without disconnecting or disturbing the sprocket and chain drive.

The two portable inflexible carrier frames, to-wit, the intermediate and outer members, are alike, except in respect to some of the attachments thereof, and, as shown, each is made up chiefly of four corner posts 17, upper cross tie beams 18, central longitudinal beams 19 connecting the intermediate portions of said beams 18, and upper and lower longitudinal side bars 20 and 21 connecting respectively the upper and lower portions of said posts 17. Caster wheels 22 are applied to the lower ends of the posts 17; these are adapted to run on the floor or platform or on the bottom of the box car. The intermediate truck frame is connected to the so-called first or head truck frame, and to the outer truck frame by flexible or jointed frame sections, each of which, as shown, is made up of three joint frames, indicated as entireties by the numerals 23, 24 and 25, pivotally connected to each other by upper and lower pivot joints 26. The said pivotally connected joint frames are limited in their pivotal movements by coöperating stop shoulders 27. The two end joint frames 23 and 25 are alike except that they have their like ends extended in reversed directions, and each of these is pivotally connected to knuckle brackets 28, by upper and lower pivot joints 29 and 30. These knuckle frames 28 are connected to heavy laterally spaced lugs 31, secured to the adjacent ends of the inflexible truck frames, by horizontal pivot joints 32.

Figure 1:
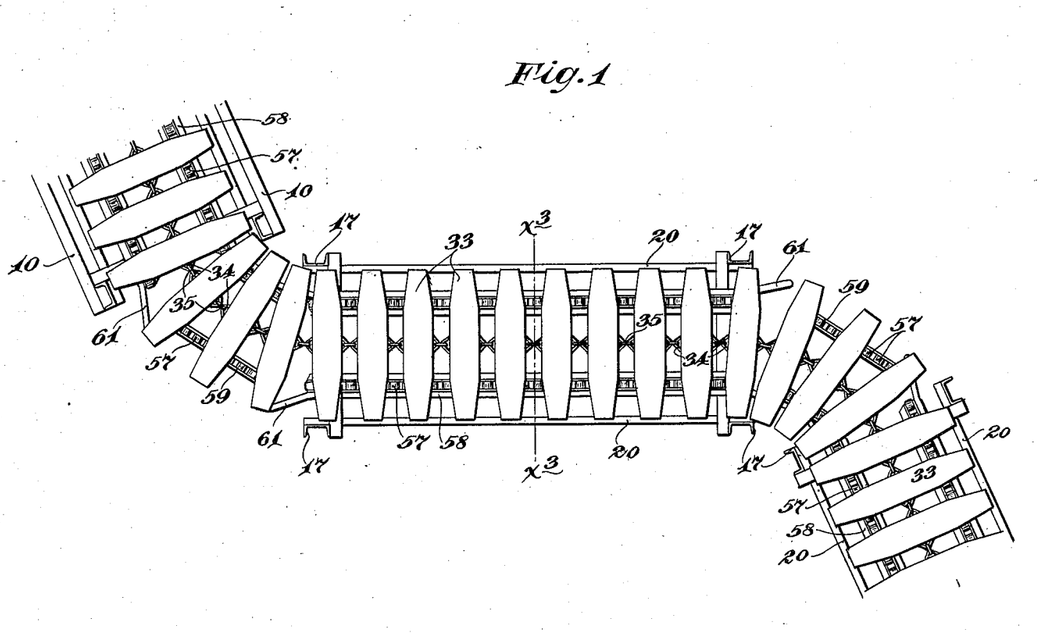
Figure 1 is a plan view with parts broken away, showing the improved carrier.
Figure 2:
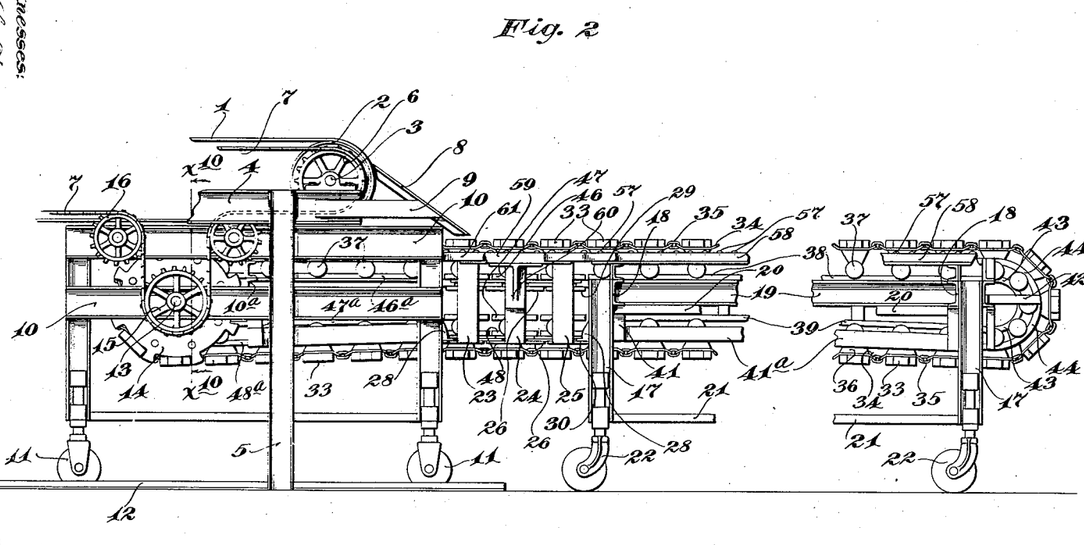
Fig. 2 is a side elevation with parts broken away, showing the carrier.
Figure 3:
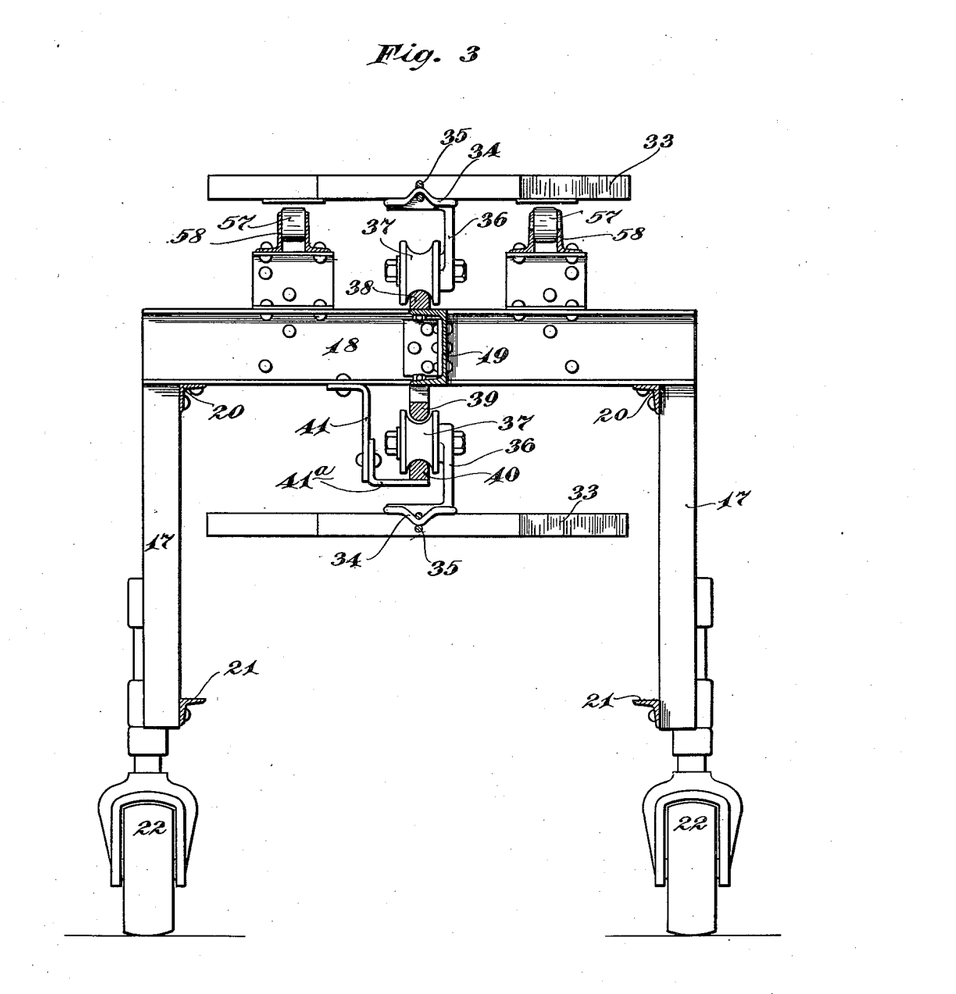
Fig. 3 is a transverse vertical section taken on the line $x^3$ $x^3$ of Fig. 1.

By means of the connections described, freedom for very considerable lateral movements is given to the intermediate and outer truck frames or inflexible frame sections, and also a certain vertical flexibility or freedom of movement is given to the said truck sections, by means of the horizontal pivot joints 32. A long flexible endless carrier is arranged to run over suitable guides, hereinafter described, on the several sections of the portable carrier framework, and this endless carrier is preferably made up of heavy transverse slats 33 which, at their intermediate portions, are connected for both vertical and lateral flexibility, by means of a coupling chain comprising relatively large and small links 34 and 35, the former of which are rigidly secured to said slats and the latter of which are located between adjacent slats. To the intermediate portion of each slat 33 is rigidly secured a wheel bracket 36, having a laterally projecting stud to which a grooved wheel 37 is journaled. The grooved wheels 37 are guided by track rails arranged and supported as follows: Rigidly secured respectively to the upper and lower flanges of the central longitudinal beams 19 of the intermediate and outer truck frames are longitudinally extended rails 38 and 39, and located below but parallel with said rails 39 are other rails 40 which, as shown, are secured to the cross beams 18 of the said truck frames by brackets 41 and longitudinal angle irons 41$^a$. Rigidly secured to the outer end of the outer truck frame, as shown, by brackets 42, are approximately semi-circular parallel rails 43 and 44 (see Fig. 2). The said rail 43 extends from the outer end of the upper rail 38 to the outer end of the rail 39, and the rail 44 extends from the outer end of the rail 40 concentric with the said rail 43 and terminates above the outer end of said rail 38. Rigidly secured to the joint frames 23, 24 and 25 are short rails 45, 46, 47 and 48. The short rails 46 aline with and form extensions of the rails 38; the rails 47 aline with and form extensions of the rails 39; the rails 48 aline with and form extensions of the rails 40; and the rails 45 are spaced apart from, and are located above and are parallel with said rails 46.

Figure 5:
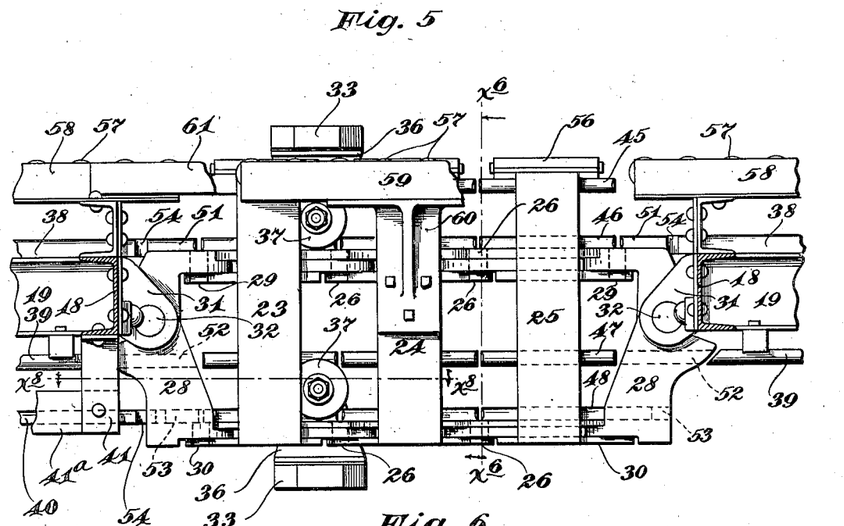
Fig. 5 is a side elevation of the part shown in Fig. 4 and shows the flexible section straightened out.
Figure 8:
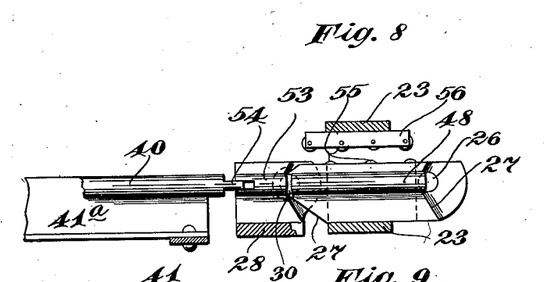
Fig. 8 is a horizontal section taken approximately on the line $x^8$ $x^8$ of Fig. 5.
Figure 9:
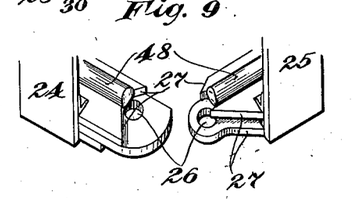
Fig. 9 is a perspective view showing separated parts of one of the pivotal joints of one of the flexible sections of the carrier.
Figures 10, 11:
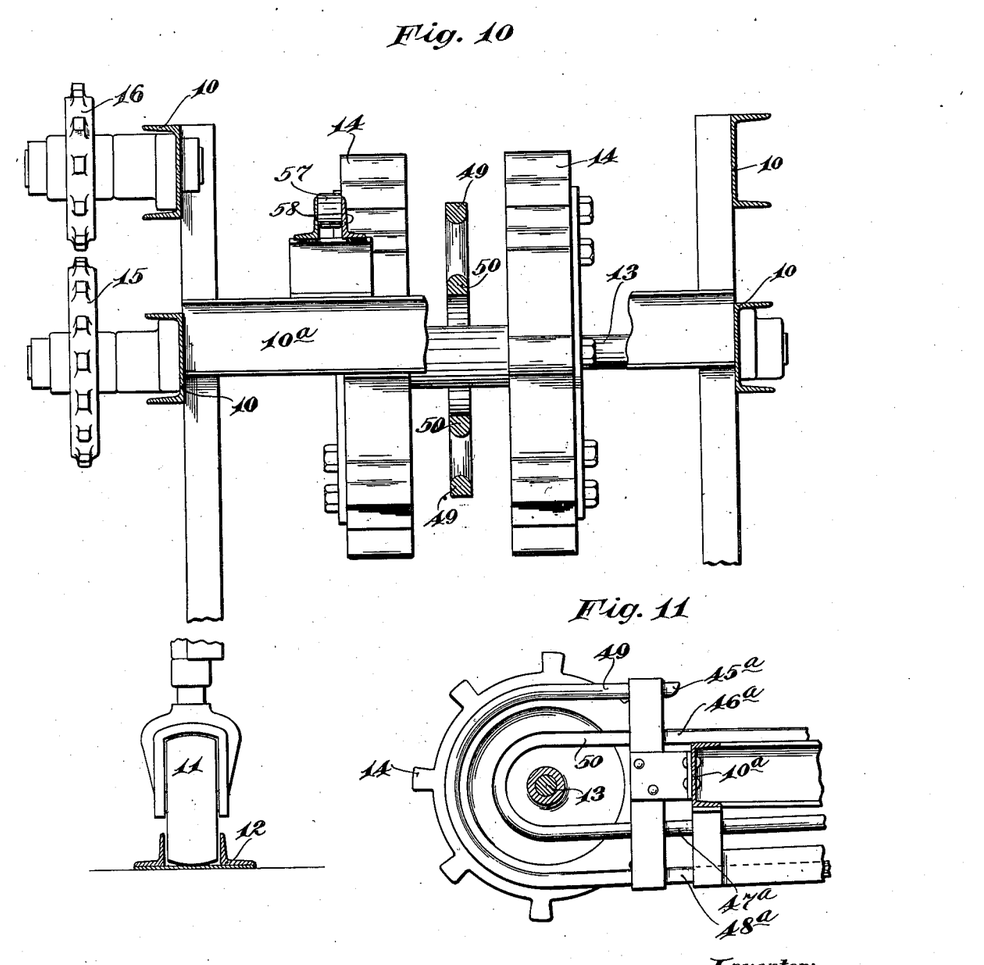
Fig. 10 is a vertical section taken approximately on the line $x^{10}$ $x^{10}$ of Fig. 2, some parts being broken away.
Fig. 11 is a detail in vertical section, showing guides and coöperating parts, at the head section of the carrier.

The innermost rails 45, 46, 47 and 48 aline respectively with the extremities 45$^a$, 46$^a$, 47$^a$ and 48$^a$ of two curved rails 49 and 50. These rails 49 and 50 are parallel throughout their length, their outer ends are suitably secured to the so-called first truck frame, and their curved extremities surround and are concentric to the axis of the shaft 13 (see particularly Figs. 10 and 11). On the knuckle frames 28 are very short rail sections 51, 52 and 53, that are alined respectively with the end members of the rails 46, 47 and 48 and are connected by interlapping joints 54 (see Figs. 5 and 8) to the rail ends 46$^a$, 47$^a$ and 48$^a$ and to the rails 38, 39 and 40. In this way an endless track of flexible joints is provided for the carrier wheels 37.

Figure 4:
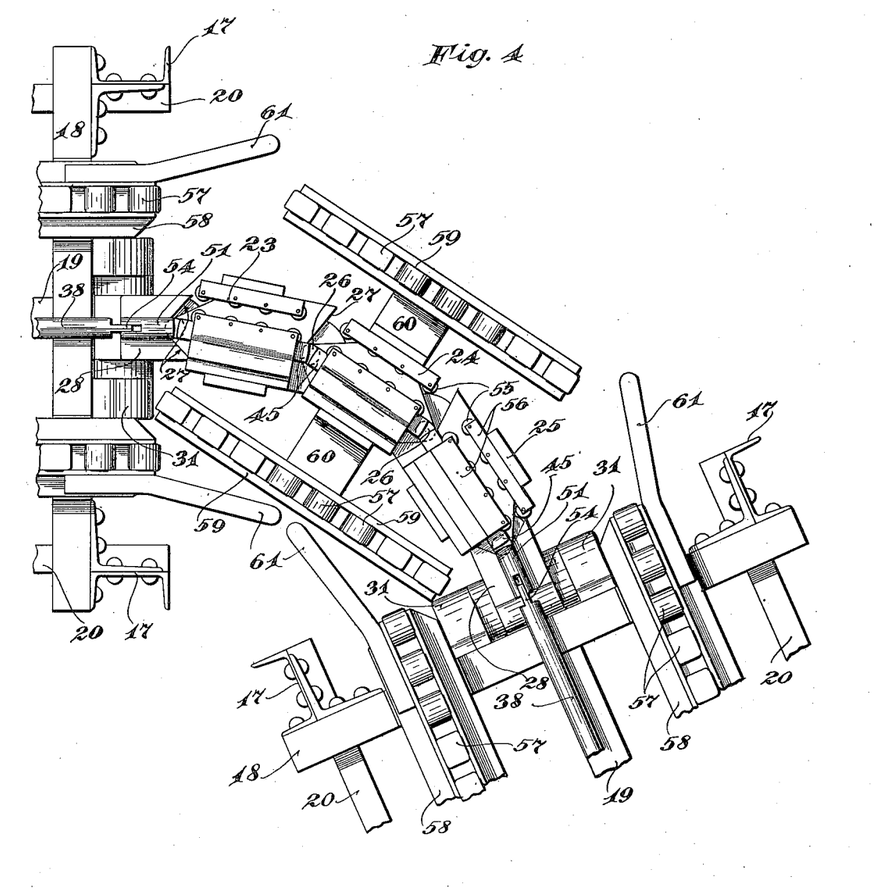
Fig. 4 is a detail in plan with some parts removed, showing one of the flexible sections of the carrier.
Figure 6:
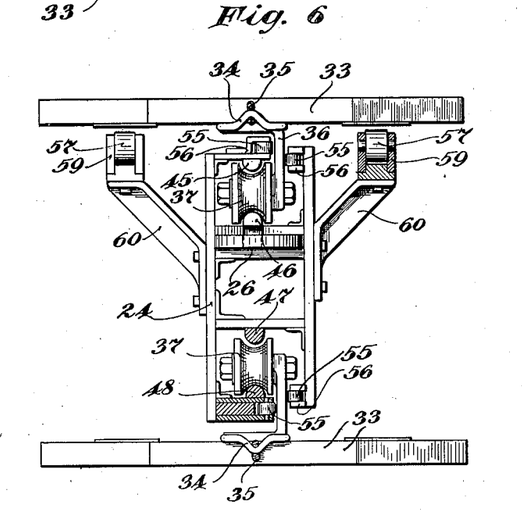
Fig. 6 is a transverse vertical section taken approximately on the line $x^6$ $x^6$ of Fig. 5, some parts being left in full.
Figure 7:
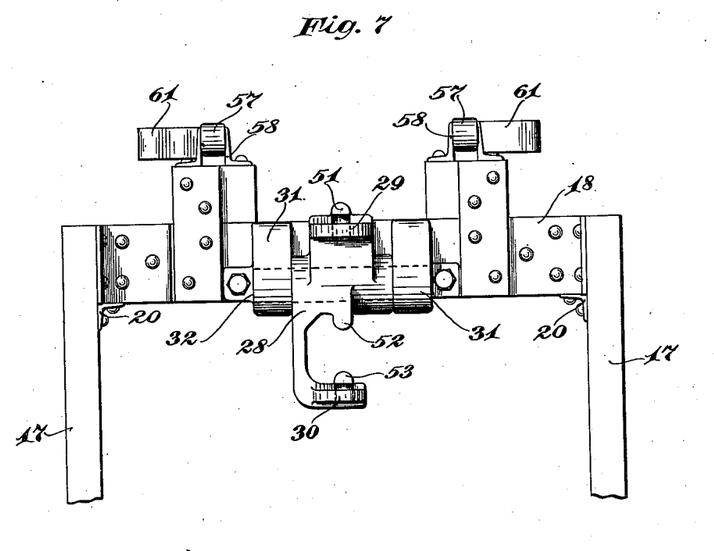
Fig. 7 is an end elevation with parts broken away and some parts removed looking at the end of one of the inflexible sections of the carrier.

By reference particularly to Fig. 6, it will be noted that the upper and lower portions of the joint frames 23, 24 and 25 are formed with openings, through which the vertical portions of the carrier brackets 36 may freely pass, and on both sides of these openings are small anti-friction guide wheels 55 mounted in longitudinally extended bearing heads 56, secured on said brackets. These wheels 55 resist a lateral thrust of the brackets 36, when the flexible endless carrier is caused to turn a curve, at one of the flexible joints of the supporting framework. The carrier wheels 37, on their upper course, run over the rails 38, 46 and 51 and over the upper horizontal portions 46ª of the bent rail 50. The upper rails 45 simply hold the said wheels 37 against displacement. On their return movement, the said wheels 37 run over the rails 40, 48 and 53 and over the lower horizontal 48ª portion of the curved rail 49. The curved rails 49 and 50 guide the said rollers as they travel from their lower to their upper positions and the curved rails 43 and 44 guide the said rollers as they travel from their upper to their lower positions. The transverse slats or bars 33 of the flexible endless carrier are adapted to frictionally engage and are prevented from toppling over, by two laterally spaced series of underlined closely-positioned anti-friction wheels 57. The anti-friction wheels 57, which are located over the inflexible or truck frame sections, are journaled to longitudinally extended bars 58 secured to the latter. The wheels 57, which are located over the flexible sections of the carrier, are journaled to laterally spaced bars 59 secured to arms 60 which, in turn, are rigidly secured to the intermediate joint frames 24, as best shown in Figs. 4 and 6. Furthermore, the outer members of the bars 58 are provided with horizontally extended arms 61 that overlap the outer bars 59, as best shown in Fig. 4, and assist in preventing the carrier bars 33 from toppling over in traveling over one of the flexible frame sections.

As already stated, the improved carrier is especially designed for use in loading and unloading cars. These cars, which will usually be of a box-car type, have, as is well known, side doors through which the sacks, boxes or other parcels must be carried in or out of the car. The carrier will be arranged on an elevated platfom at the side of the track and will be arranged to run from the platform into the car through one of its side doors. The lateral flexibility of the carrier frame and of the slat-equipped endless carrier permits the delivery end of the carrier to be moved to either end of the car and to be moved from side to side of the car so that the parcels may be delivered within reach of the person who receives and piles the same in the car. The straight-line traveling movement of the so-called head frame of the carrier permits the delivery end of the carrier to be moved inward or outward or forward or backward within the car or, in other words, permits the operative portion of the carrier to be extended to variable distances from the delivery end of the supply belt 1. Such movements do not, however, interfere with the driving connection between the chain 7 and the sprocket 15, so that the flexible endless carrier may be properly driven in all its different positions.

A carrier of the character described above will be found to be a great labor saver in a very great many different places. It will be found especially seviceable to use, for instance, in flour mills for loading the cars with flour sacks. In such an application of the carrier, the so-called supply belt 1 would run from the interior of the flour mill from a point close in the vicinity of the packers and carry the sacks therefrom out onto the platform at the side of the track, where the sacks will be delivered to the portable carrier as already described.

What I claim is:

1. The combination with a portable endwise movable framework comprising head, intermediate and outer end sections, flexibly connected by joint frames having a multiplicity of vertical and horizontal pivots, of an endless jointed track on the said frame sections, a laterally and vertically flexible endless carrier having wheels arranged to run on the said endless track, and means for driving said carrier while permitting lateral and endwise movements thereof.

2. The combination with means for supplying parcels at a predetermined point, of a portable carrier frame comprising head, intermediate and outer end sections, the former of which is mounted to move endwise, and which intermediate and outer end sections are adapted to move both endwise and laterally, and of a vertically and laterally flexible endless carrier mounted to run over suitable guides on said frame sections, and in all positions to receive the parcels at the said predetermined point of supply.

3. The combination with a stationary framework and parcel supplying means mounted thereon, of a portable framework comprising head, intermediate and outer end sections and pivotally connected joint frames flexibly connecting the same with freedom for lateral movements, wheels supporting said head frame sections for straight-line movements, but under said parcel supplying means, caster wheels supporting said intermediate and outer end sections for both endwise and lateral movements, an endless sectional track applied to the said first frame sections, and an endless laterally and vertically flexible carrier having wheels arranged to run on said endless track, and means for driving said endless carrier but permitting traveling movements of said portable framework.

4. The combination with a framework comprising head, intermediate and outer end sections and pivotally connected joint frames flexibly connecting the same for lateral movements, wheels supporting said head frame section for endwise movements, caster wheels supporting said intermediate and outer end frame sections for both endwise and lateral movements, an endless sectional track supported by said first frame sections, an endless carrier made up of transverse slats flexibly connected at their intermediate portions for both vertical and lateral pivotal movements, and means for driving said endless carrier while permitting traveling movements of said portable framework.

In testimony whereof I affix my signature in presence of two witnesses.

STANLEY G. HARWOOD.

Witnesses:
HARRY D. KILGORE,
F. D. MERCHANT.